US009984332B2

(12) United States Patent
Garrod

(10) Patent No.: US 9,984,332 B2
(45) Date of Patent: May 29, 2018

(54) BAYESIAN-CENTRIC AUTONOMOUS ROBOTIC LEARNING

(71) Applicant: NPC Robotics Corporation, Mound, MN (US)

(72) Inventor: Michael Garrod, Spring Park, MN (US)

(73) Assignee: NPC Robotics Corporation, Mound, MN (US)

( * ) Notice: Subject to any disclaimer, the term of this patent is extended or adjusted under 35 U.S.C. 154(b) by 106 days.

(21) Appl. No.: 15/221,461

(22) Filed: Jul. 27, 2016

(65) Prior Publication Data

US 2016/0332298 A1 Nov. 17, 2016

Related U.S. Application Data

(63) Continuation-in-part of application No. 14/533,701, filed on Nov. 5, 2014.

(Continued)

(51) Int. Cl.
*G06N 7/00* (2006.01)
*G05D 1/00* (2006.01)
*G05D 1/02* (2006.01)
*B25J 9/16* (2006.01)
*G06N 3/00* (2006.01)

(52) U.S. Cl.
CPC ............ *G06N 7/005* (2013.01); *B25J 9/163* (2013.01); *G05D 1/0088* (2013.01); *G05D 1/0274* (2013.01); *G05B 2219/39376* (2013.01); *G06N 3/008* (2013.01); *Y10S 901/01* (2013.01); *Y10S 901/02* (2013.01)

(58) Field of Classification Search
CPC ............ G05D 1/0274; G05D 1/0088; G05D 2201/0207; Y10S 901/01; Y10S 901/02; G05B 2219/39377; G05B 2219/39376; G06N 7/005; G06N 3/008
See application file for complete search history.

(56) References Cited

U.S. PATENT DOCUMENTS 6,954,678 B1 10/2005 Phan et al.
7,725,418 B2 * 5/2010 Gupta ...................... G06N 5/04
706/50

(Continued)

*Primary Examiner* — Jason Holloway
(74) *Attorney, Agent, or Firm* — Craige Thompson; Thompson Patent Law

(57) ABSTRACT

Various apparatus and methods include autonomous robot operations to perturb a current Bayesian equation and determining whether the perturbed Bayesian equation yields an improved probability of success of achieving a goal relative to the current Bayesian equation. In an illustrative example, the perturbation may modulate a coefficient of a parameter in the Bayesian equation. In some examples, the perturbation may include assessment of whether adding or removing a parameter may improve the probability of success of achieving the goal. The parameters of the Bayesian equation may include, for example, current state information, alone or in combination with sensor input values and/or historical information, for example. In some implementations, the robot may advantageously autonomously optimize its operations by perturbing a current Bayesian equation associated with, for example, a current goal, sub-goal, task, or probability of success criteria.

20 Claims, 13 Drawing Sheets

Related U.S. Application Data

(60) Provisional application No. 62/344,281, filed on Jun. 1, 2016, provisional application No. 62/198,027, filed on Jul. 28, 2015, provisional application No. 62/050,582, filed on Sep. 15, 2014, provisional application No. 62/046,264, filed on Sep. 5, 2014, provisional application No. 61/900,256, filed on Nov. 5, 2013.

(56) References Cited

U.S. PATENT DOCUMENTS

| | | |
|---|---|---|
| 8,126,832 B2 | 2/2012 | Spring |
| 8,577,538 B2 * | 11/2013 | Lenser ................. G05D 1/0274 701/2 |
| 8,700,620 B1 | 4/2014 | Lieberman |
| 2005/0197988 A1 | 9/2005 | Bublitz |
| 2006/0167917 A1 * | 7/2006 | Solomon .............. G05B 19/418 |
| 2007/0233321 A1 * | 10/2007 | Suzuki ................. G05D 1/0251 700/245 |
| 2009/0132445 A1 * | 5/2009 | Rice ....................... G06N 7/005 706/12 |
| 2009/0177323 A1 * | 7/2009 | Ziegler .................. B25J 5/007 700/259 |
| 2010/0312388 A1 * | 12/2010 | Jang .................... G05D 1/0088 700/248 |
| 2012/0209652 A1 * | 8/2012 | Khosla ............... G06Q 10/0631 705/7.16 |
| 2013/0231779 A1 * | 9/2013 | Purkayastha .......... B25J 9/1697 700/259 |
| 2018/0012137 A1 * | 1/2018 | Wright ................... G06N 7/005 |

* cited by examiner

BAYESIAN-CENTRIC AUTONOMOUS ROBOTIC LEARNING

CROSS-REFERENCE TO RELATED APPLICATIONS

This application claims the benefit of U.S. Provisional Application Ser. No. 62/344,281 titled "Geo-Fencing for All Terrain Robotics," filed by Michael Garrod on Jun. 1, 2016, and U.S. Provisional Application Ser. No. 62/198,027 titled "Machine Learning for Robotics," filed by Michael Garrod on Jul. 28, 2015, and is also a Continuation-in-Part of U.S. application Ser. No. 14/533,701 titled "Low-Resistance Slip Drive of Endless Track," filed by Domholt, et al. on Nov. 5, 2014, which claims the benefit of U.S. Provisional Application Ser. No. 62/050,582 titled "Low-Resistance Slip Drive of Endless Track," filed by Thoreson, et al. on Sep. 15, 2014, and U.S. Provisional Application Ser. No. 62/046,264 titled "Low-Resistance Slip Drive of Endless Track," filed by Thoreson, et al. on Sep. 5, 2014, and U.S. Provisional Application Ser. No. 61/900,256 titled "Modular Drone with Self-Diagnostic Performance Maximization," filed by Domholt, et al. on Nov. 15, 2013.

This application incorporates the entire contents of the foregoing application(s) herein by reference.

TECHNICAL FIELD

Various embodiments relate generally to autonomous machine learning.

BACKGROUND

Bayesian equations are used in the production of product to predict a probability of an event based on condition that may be relevant to the event.

SUMMARY

Various apparatus and methods include autonomous robot operations to achieve a current goal by selecting output values that yield a calculated probability of success of achieving the goal relative to one or more predetermined success threshold criteria. In an illustrative example, the probability of success is calculated as a Bayesian function of candidate output values, alone or in combination with current state information and/or sensor input values, for example. In some embodiments, the predetermined threshold may be calculated based, for example, on a Bayesian function of the current state values and the current goal. In some implementations, the selected output state that satisfied the success threshold criteria may advantageously be applied, for example, as a command to a corresponding output actuator to advance the operation of the robot toward the current goal.

Various apparatus and methods include autonomous robot operations to perturb a current Bayesian equation and determining whether the perturbed Bayesian equation yields an improved probability of success of achieving a goal relative to the current Bayesian equation. In an illustrative example, the perturbation may modulate a coefficient of a parameter in the Bayesian equation. In some examples, the perturbation may include assessment of whether adding or removing a parameter may improve the probability of success of achieving the goal. The parameters of the Bayesian equation may include, for example, current state information, alone or in combination with sensor input values and/or historical information, for example. In some implementations, the robot may advantageously autonomously optimize its operations by perturbing a current Bayesian equation associated with, for example, a current goal, sub-goal, task, or probability of success criteria.

Various apparatus and methods include autonomous robot operations to receive a Bayesian equation, and corresponding parameters, associated with a desired goal from a second autonomous robot. In an illustrative example, the parameters of the Bayesian equation may include, for example, current state information, alone or in combination with sensor input values and/or historical information, for example. In some implementations, the robot may advantageously autonomously optimize its operations by perturbing, in accordance with the received Bayesian equation and parameters, a current Bayesian equation associated with, for example, a current goal, sub-goal, action, or probability of success criteria. In some implementations, the receiving robot may advantageously autonomously optimize its operations more efficiently by evaluating the received Bayesian equation and corresponding parameters to perturb the current Bayesian equation associated with the desired goal such that the current Bayesian equation may include parameters for which the receiving robot has no reference.

Various embodiments may achieve one or more advantages. For example, some embodiments may dynamically modify actions performed by a robot to increase a probability of successfully completing a goal. In various embodiments, a composite goal structure includes a relationship of goals such that a hierarchy component may be introduced into a Bayesian equation to balance goals having opposite effects. For example, a first goal may include an objective to travels up a flight of stairs at a maximum speed while a second goal may include an objective to maximize stability to prevent against tipping over. As such the first goal and second goal may produce opposing effects. The Bayesian equation may determine a set of actions to be performed that may balance the effects of the first goal and the second goal. In some embodiments, a goal may include a weight factor. For example, the second goal may include a weight factor greater than the first goal such that preventing tipping over is prioritized over traveling at maximum speed.

The Bayesian equation may function to advance the learning of a robot. For example, each time that the Bayesian equation determines a probability of successfully completing a goal, the robot, via a Bayesian delta module, may determine a difference of the determined probability against an expected probability (e.g., predetermined probability or previously stored probability). If the determined probability produces a positive effect over the expected probability, the Bayesian equation (e.g., coefficients and parameters) may be updated to reflect the positive effect. If the determined probability produces a negative effect, any potential updates to the Bayesian equation may be discarded. In various embodiments, a probability of success may be determined in accordance with sensor input. A probability of success may be determined for each goal, sub-goal, and a set of actions.

The details of various embodiments are set forth in the accompanying drawings and the description below. Other features and advantages will be apparent from the description and drawings, and from the claims.

DETAILED DESCRIPTION OF ILLUSTRATIVE EMBODIMENTS

To aid understanding, this document is organized as follows. First, an exemplary operational dynamic control engine and a dynamic perturbing engine are briefly introduced with reference to FIGS. 1-3. Second, with reference to FIGS. 4-5, the discussion turns to exemplary embodiments that illustrate high-level views of an artificial intelligence operating system and a composite goal structure used by the AI operating system. With reference to FIGS. 5-11, further explanatory discussion is presented to explain individual processes of the AI operating system. Finally, a robot-to-robot (RTR) communication system is discussed in FIGS. 12-13.

Figure 1:
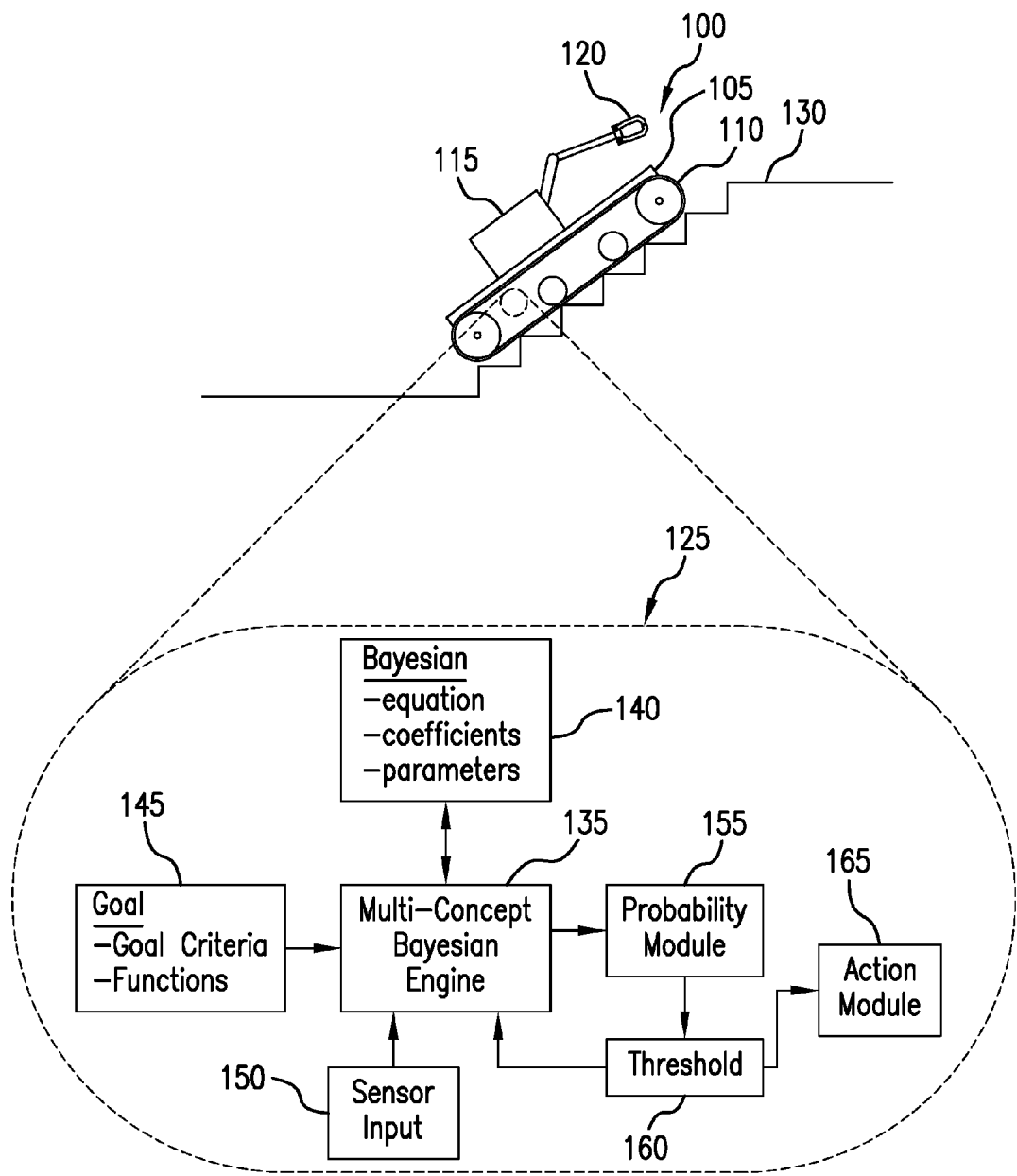
FIG. 1 depicts a side view of a mobile autonomous platform traveling up a flight of stairs and a schematic view of an exemplary operational dynamic control engine.

FIG. 1 depicts a side view of a mobile autonomous platform traveling up a flight of stairs and a schematic view of an exemplary operational dynamic control engine. As depicted, a mobile autonomous platform 100 includes a body 105. The body 105 operably connects to a track system 110. The body 105 operably connects to a payload module 115. The accessories module 115 operably and releasably attaches to a payload 120. In various embodiments, the payload 120 may be any mission-specific electrical or mechanical tool configured to operate with the mobile autonomous platform 100. The body 105 further includes an operational dynamic control engine (ODCE) 125 that continuously calculates output values based on a probability of success such that the mobile autonomous platform 100 may successfully achieve a target goal, such as, for example, travel up a flight of stairs 130.

The ODCE 125 includes a multi-concept Bayesian engine (MCBE) 135. As depicted, the MCBE 135 receives a goal from a goal store 145. The goals may include one or more goal criteria and functions associated with accomplishing a desired goal (described in further detail in FIG. 5). In response to receiving the desired goal, the MCBE 135 requests and receives from a Bayesian data store 140 a Bayesian equation including parameters and coefficients related to the desired goal. The MCBE 135 receives from a sensor input 150 sensor information. The MCBE 135 determines, via a probability module 155, a probability of success for the desired goal.

As depicted, the desired goal is traveling up the flight of stairs 130. As such the probability module 155 determines a probability of success for completing the goal. The probability of success may be based on criteria, such as, for example, the one or more goal criteria, the equation, the parameters, the coefficients and the sensor information. The ODCE 125 determines, via a threshold module 160, whether the determined probability of success is greater than a predetermined threshold. In the event that the determined probability of success is greater than the predetermined threshold, an action queue 165 is updated to reflect actions necessary for completion of the goal. If the determined probability of success is less than the predetermined threshold, the ODCE 125 may introduce the determined probability of success into the MCBE 135 to be accounted for in a later probability of success.

The MCBE 135 may receive, in various embodiments, state information for a component of the mobile autonomous platform 100. The MCBE 135 may use the received state information when determining a probability of success. In some implementations, the determined probability of success that satisfied the predetermined threshold may advantageously be applied, for example, as a command to a corresponding output actuator to advance the operation of the mobile autonomous platform 100 toward the desired goal.

Figure 2:
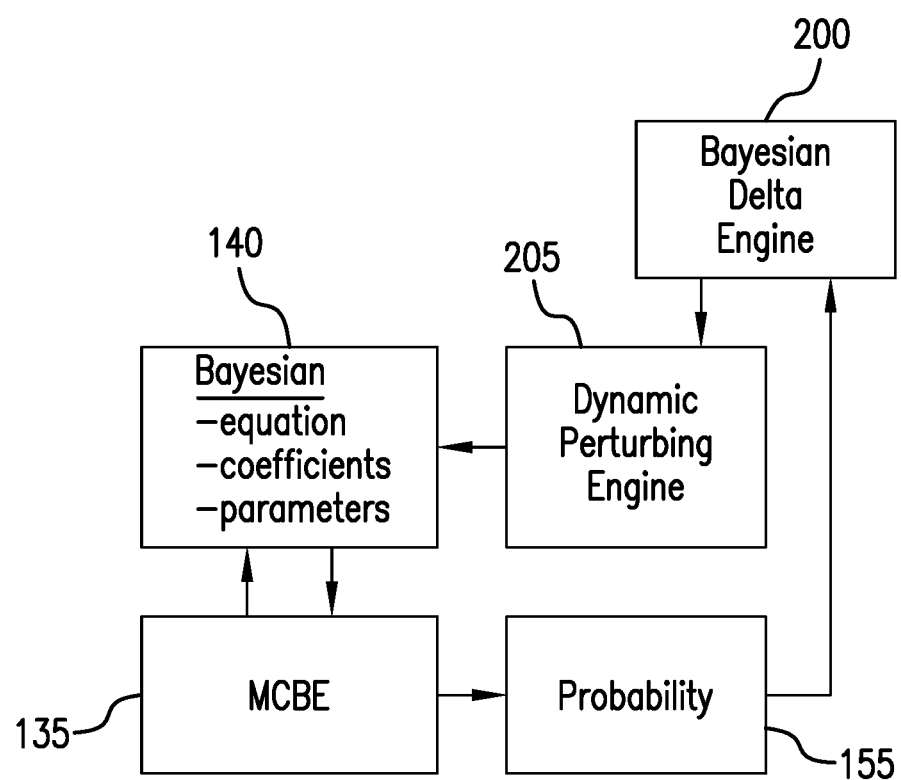
FIG. 2 depicts a schematic view of an exemplary dynamic perturbing engine.

FIG. 2 depicts a schematic view of an exemplary dynamic perturbing engine. The MCBE 135, with reference to FIG. 1, operably connects to the Bayesian data store 140 to request and retrieve a current Bayesian equation including parameters and coefficients related to a desired goal. The MCBE 135 determines a probability of success via the probability module 155. The probability of success may be based on the current Bayesian equation, the retrieved set of coefficients, and received sensor information. The probability module 155 transmits a determined probability to a delta computation engine 200. The delta computation engine 200 determines, in response to the received determined probability of success, a rate of change of the probability of success (e.g., compared to a prior probability of success associated with the desired goal). The delta computation engine 200 determines a delta between the parameters and coefficients of the current Bayesian equation and the parameters and coefficients based on the probability of success. The delta computation engine 200 transmits the delta to a dynamic perturbing engine (DPE) 205. The DPE 205 determines whether the delta yields an improved probability of success of achieving the desired goal relative to the current Bayesian equation. The DPE 205 perturbs the current Bayesian equation and coefficients accordingly if the DPE 205 warrants that a modification is necessary in accordance with a yield of an improved probability of success.

In various embodiments, the DPE 205 may modulate a coefficient of a parameter in the Bayesian equation. In an illustrative example, the perturbation may include assessment of whether adding or removing a parameter may improve the probability of success of achieving the goal. The parameters of the Bayesian equation may include, for example, current state information, alone or in combination with sensor input values and/or historical information, for example. In some implementations, a robot may advantageously autonomously optimize its operations by perturbing a current Bayesian equation associated with, for example, a current goal, sub-goal, task, or probability of success criteria.

Figure 3:
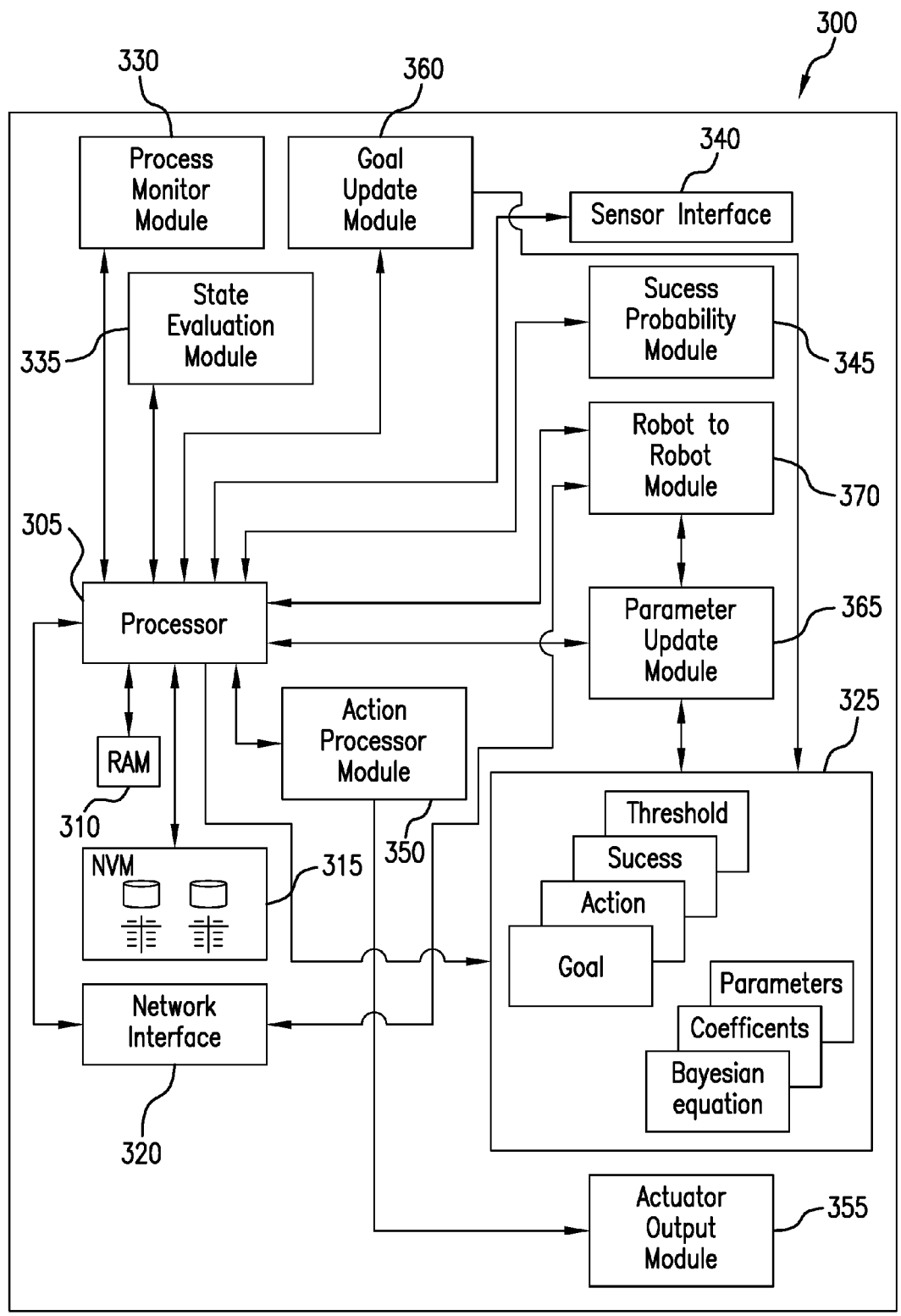
FIG. 3 depicts a schematic view of an exemplary robotic learning control system.

FIG. 3 depicts a schematic view of an exemplary robotic probability and learning module. A robotic probability and learning module (RPLM) 300 includes a processor 305 that operably connects to random access memory 310 and non-volatile memory 315. The processor 305 may receive a desired goal from a network interface 320. The processor 305, in response to receiving a desired goal, may access, via a goal data store 325, a current Bayesian equation and goal criteria associated with the received desired goal. As depicted, the goal criteria include action, success criteria, and threshold. The Bayesian equation includes coefficients and parameters. In various embodiments, the goal criteria may further include confidence parameters and effects. The processor 305, after receiving the current Bayesian equation and parameters, may identify which components are necessary to the accomplish the desired goal. For example, with reference for FIG. 1, the ODCE 125 may determine that payload 120, such as a flashlight, is necessary to accomplish a desired goal. The ODCE 125 may determine that the track system 110 may be necessary to achieve a goal requiring displacement of the mobile autonomous platform 100. The ODCE 125 may further determine that along with the track system 110, the payload 120, a power module, and a temperature sensor in body 105 may be necessary to achieve the goal. In various embodiments, any combination of one or modules of the body 105 in combination with the payloads and in combination with the track system may be determined by the ODCE 125 as necessary to perform a task associated with a goal based on a Bayesian equation.

The processor 305 operably connects to a process monitor 330 to identify any process, processor, or module that may be inoperable. For example, in the event that a state evaluation module 335 is not responding, the processor 305, via the process monitor 330 may reinitialize the state evaluation module 335. As depicted, the process monitor 330 monitors the state evaluation module 335 via the processor 305. In an illustrative example, the process monitor 330 may directly connect to any module.

The processor 305 operably connects to the state evaluation module 335 to determine an operation state for each identified necessary component to complete the desired goal. The processor 305 uses the determined operation state(s), along with sensor information received from a sensor interface 340, the received goal criteria, coefficients, and parameters, to determine, via a probability module 345, and in accordance with the current Bayesian equation, a probability of successfully completing the desired goal. An action module 350 operably connects to the processor 305 to determine whether an action or set of actions needs to be modified to successfully complete the desired goal in accordance with the determined probability. The action module 350 transmits an updated action, or set of actions, to an actuator output 355. The actuator output 355 may actuate components, in accordance with the updated action, to further the successful completion of the desired goal.

The processor 305 operably connects to a goal update module 360 and a parameter update module 365 such the goal update module 360 and the parameter update module 365 receive the determined probability. The goal update module 360 and the parameter update module 365 operably connect to the goal data store 325 to modify the current Bayesian equation, the coefficients, the goal criteria, or the parameters in accordance with a delta (reference FIG. 2) having improved probability of success of achieving the desired goal relative to the current Bayesian equation.

A robot-to-robot (RTR) communication module 370 operably connects to the network interface 320 to monitor for communication signals from another robot. In the event that another robot is recognized, the RTR communication module 370 may coordinate information sharing with the other robot. For example, the RTR communication module 370 may share probability of success information with the other robot to perturb the current Bayesian equation in accordance with the shared information.

Figure 4:
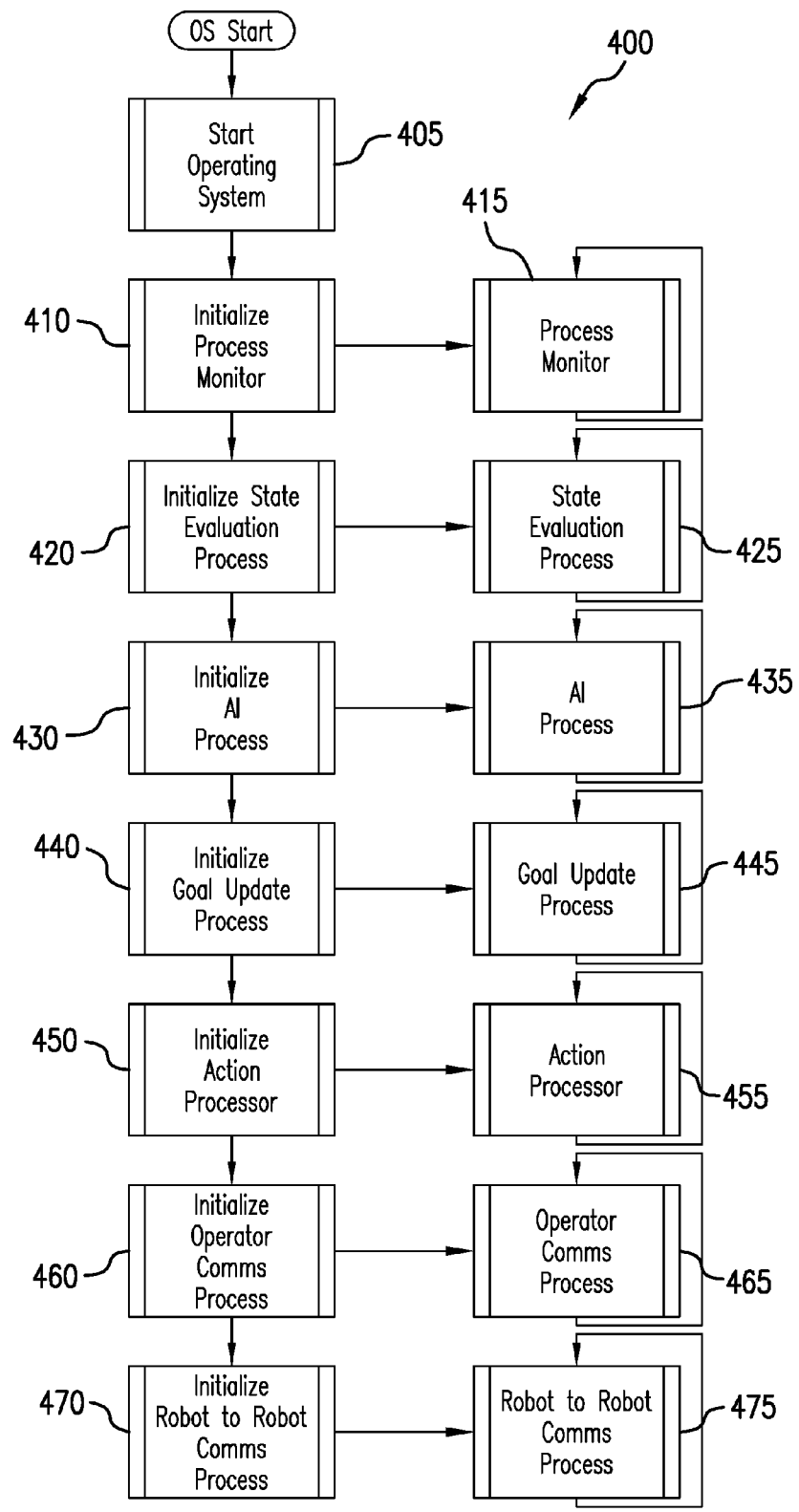
FIG. 4 depicts a flowchart illustrating an exemplary artificial intelligence (AI) operating system.

FIG. 4 depicts a flowchart illustrating an exemplary artificial intelligence (AI) operating system. As depicted, an AI operating system 400 powers on, at 405. Once the AI operating system 400 has started, the AI operating system 400 initializes, at 410, a process monitor. The process monitor operates in a process monitor continuous loop, at 415, so long as the AI operating system 400 is powered on. At 420, the AI operating system 400 initializes a state evaluation module. The state evaluation module operates in a state evaluation continuous loop, at 425, so long as the AI operating system 400 is powered on. At 430, the AI operating system 400 initializes an AI module. The AI module operates in an AI continuous loop, at 435, so long as the AI operating system 400 is powered on. At 440, the AI operating system 400 initializes a goal update module. The goal update module operates in a continuous loop, at 445, so long as the AI operating system 400 is powered on.

The AI operating system 400 initializes, at 450, an action module. The action module operates in an action module continuous loop, at 455, so long as the AI operating system 400 is powered on. At 460, the AI operating system 400 initializes an operator communications module that operates in a communications continuous loop, at 465, while the AI operating system 400 is powered on. The AI operating system 400 initializes, at 470, a robot-to-robot (RTR) communications module. The RTR communications module operates, at 475, in a RTR continuous loop so long as the AI operating system 400 is powered on.

In various embodiments, the AI operating system 400 may initialize the modules at steps 420, 430, 440, 450, 460, 470 concurrently and independent of each other. In some embodiments, the AI operating system 400 may initialization the steps 420, 430, 440, 450, 460, 470 in accordance with one or more predetermined initialization criteria.

In some embodiments, the AI operating system 400 may include a self-diagnostic system to ensure proper operation of the AI operating system 400. The self-diagnostic system may execute at any time (e.g., when powered on) during the operation of the AI operating system 400. Such self-diagnostic systems have been described, for example, in FIG. 1 and at [0026], of the U.S. Provisional Application Ser. No. 61/900,256, titled "Modular Drone with Self-Diagnostic Performance Maximization," filed by Domholt, et al., on Nov. 15, 2013, the entire disclosure of which is hereby incorporated by reference.

Figure 5:
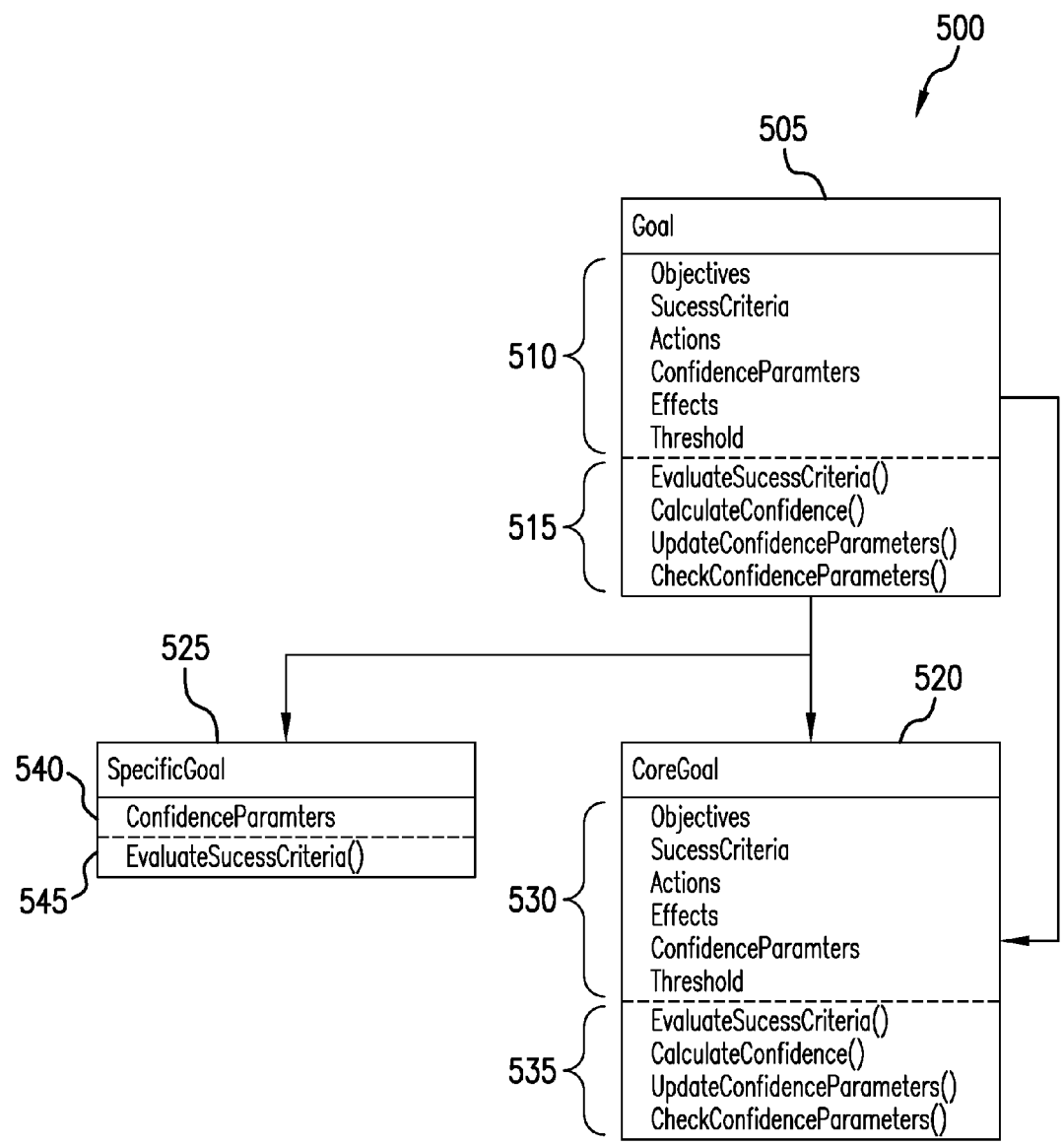
FIG. 5 depicts a chart illustrating a composite pattern for a goal based system for use with an exemplary AI operating system.

FIG. 5 depicts a chart illustrating a composite pattern for a goal based system for use with an exemplary AI operating system. A goal based system 500 includes a goal 505. The goal 505 includes goal criteria 510 and evaluation functions 515. As depicted, the goal criteria 510 includes objectives, success criteria, actions, confidence parameters, effects and thresholds. The evaluation functions 515, as depicted, include a function to evaluate success criteria, a function to calculate a confidence, an update confidence parameter function and a check confidence parameter function. The evaluation functions 515 may perform functions based on the goal criteria 510.

As depicted, the goal 505 operably relates to a core goal 520 and a specific goal 525. The core goal 520 includes a similar set of goal criteria 530 and a similar set of evaluation functions 535 such that the evaluation sets 535 may perform functions based on the goal criteria 530. As depicted, the specific goal 525 includes a single goal criterion 540 and a single function 545.

In some embodiments, the goal 505 operably relates to the core goal 520 and the specific goal 525 such that any goal criteria 530, 540 or any evaluation functions 535, 545 of the core goal 520 and the specific goal 525 may affect the goal criteria 510 and the evaluation functions 515 of the goal 505. The goal 505 may operably relate to a plurality of core goals and/or a plurality of specific goals. In the event that a plurality of goals operably relates to the plurality of core goals and/or the plurality of specific goals, each goal, core goal, and/or specific goals may include a weight factor parameter. The weight factor parameter may create a priority hierarchy such that, with reference to FIG. 4, the AI operating system 400 may execute a combination of goals, core goals, and specific goals in accordance with the priority hierarchy. The depicted composite structure of the goal 505 may introduce into a Bayesian equation a hierarchy to balance goals having opposite effects. For example, a composite goal may include the goal 505 having an objective for a robot traveling from a first location to a second location at maximum speed. The composite goal may further include the core goal 520 having an objective for not tipping over. As such the composite structure of the goal 505 introduces a hierarchy component into a Bayesian equation that may prevent operation at maximum speed in the event that traveling at maximum speed causes the robot to tip over.

Figure 6:
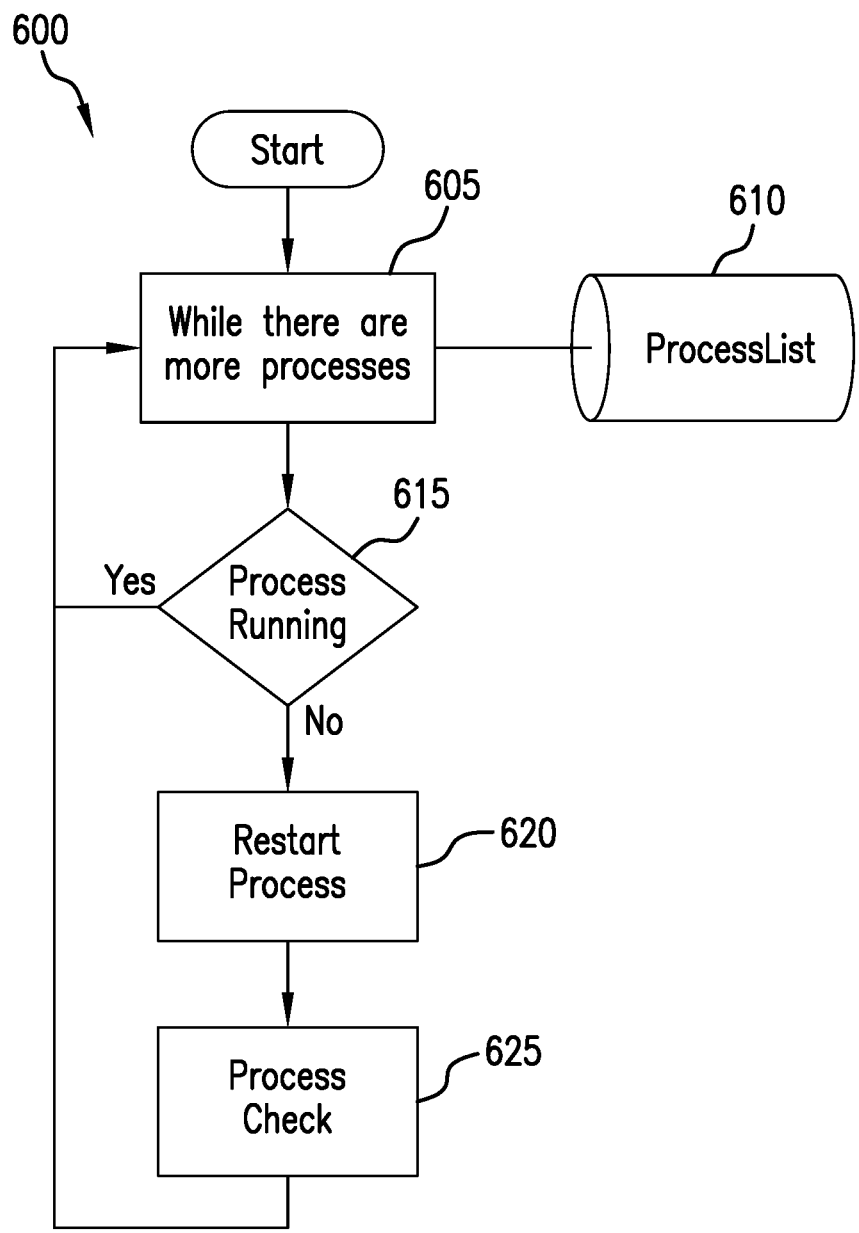
FIG. 6 depicts a flowchart of a process monitor of an exemplary AI operating system.

FIG. 6 depicts a flowchart of a process monitor of an exemplary AI operating system. With reference to FIG. 4, the AI operating system 400 may initialize, at 410, a process monitor 600. The process monitor 600 operates in a process monitor continuous loop, at 415. The process monitor 600 operates to continuously monitor 605 a process queue 610. The process queue 610 includes a list of processes. The processes may indicate the operation of status of a particular module, such as, for example, the modules described in FIG. 3 above. The process monitor 600 retrieves, from the queue 610, a specific process to determine, at 615, whether the retrieved specific process is operating. If, at 615, the process monitor 600 determines the retrieved specific process is operating, the process monitor 600 continuous to monitor, at 605, the process queue 610. If, at 615, the process monitor 600 determines the retrieved specific process is not operating, the process monitor 600 restarts, at 620, the retrieved specific process. At 625, the process monitor 600 performs a process check 625 to ensure that the retrieved specific process is operating.

In some embodiments, the process monitor 600 monitor may continue indefinitely to restart, at 620, the retrieved specific process that is not operating. The process monitor 600 may attempt a predetermined number of attempts to restart the retrieved process. In various embodiments, the process monitor 600 may attempt to restart the retrieved process in accordance with a predetermined amount of time. The process monitor 600 may generate an alert to the AI operating system 400 in accordance with one or more predetermined criteria. For example, the process monitor 600 may generate an alert to the AI operating system 400 in the event a non-operating process fails to restart after a predetermined amount of time is exceeded.

Figure 7:
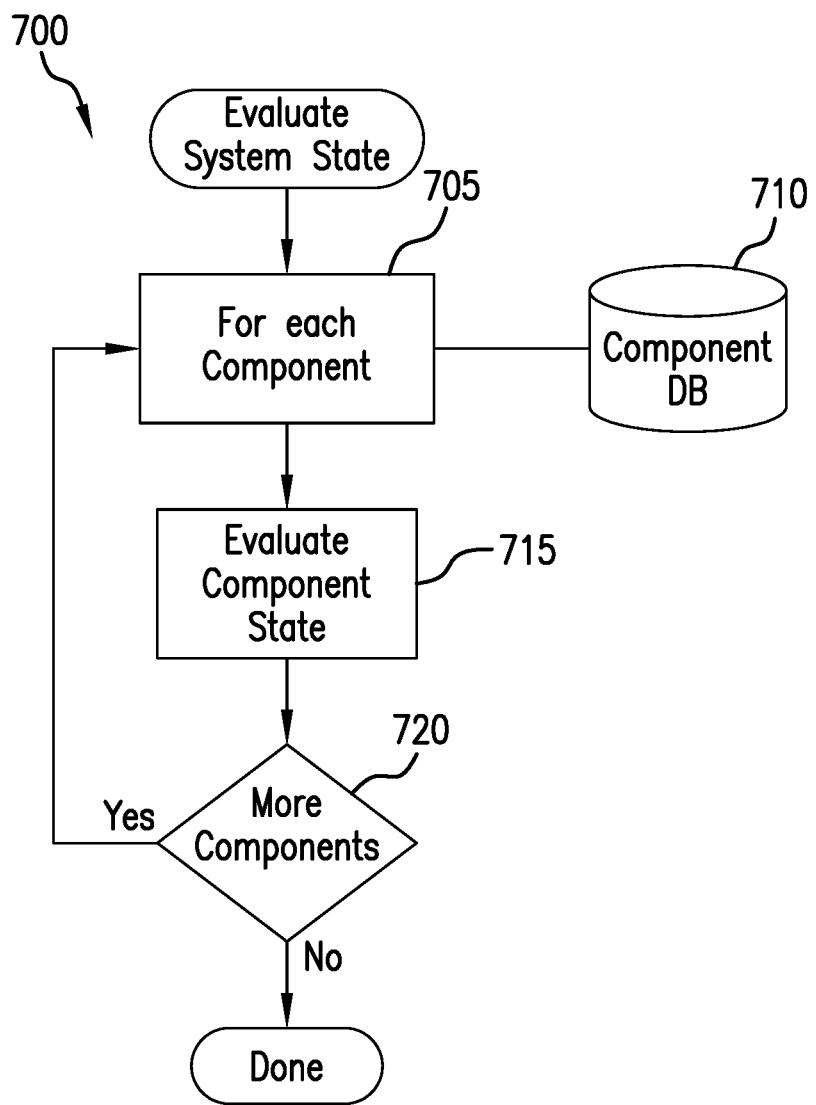
FIG. 7 depicts a flowchart for an evaluation component state module of an exemplary AI operating system.

FIG. 7 depicts a flowchart for a state evaluation component module of an exemplary AI operating system. With reference to FIG. 4, the AI operating system 400 includes a state evaluation module 700. Once the AI operating system 400 initializes, at 420, the state evaluation module 700 operates in a continuous loop, at 425. The state evaluation module 700 retrieves, at 705, specific component information data for a target component from a component data base 710 (e.g., data store 315). The component database 710 may be formed by a list of registered components available to the AI operating system 400. The component database 710 may capture specific component information data for each component as each component is initialized and registered with the AI operating system 400. Each registered component may include a heartbeat to continuously provide component state information to the state evaluation module 700.

In an illustrative example, the component information data includes a description of a component including such parameters as the component's capabilities and a component state. The state evaluation module 700 evaluates, at 715, a component state contained within the specific component information data for a target component. At 720, the state evaluation module 700 determines whether more evaluation of component states is required. If, at 720, the state evaluation module 700 determines that more evaluations of component states are required, the state evaluation module 700 retrieves, at 705, a next specific component information data for a next target component from a component database 710.

The state evaluation module 700 may monitor individual states of components in accordance to one or more predetermined criteria. For example, the state evaluation module 700 may receive, via a heartbeat of a target component, a component status every fifth of a second. In the event the state evaluation module 700 does not receive the component status for the target component in accordance with one or more predetermined criteria, such as, for example, no status received for 30 seconds, the state evaluation module 700 may update the state (e.g., component unresponsive) of the target component and store the updated state in the component database.

Figure 8:
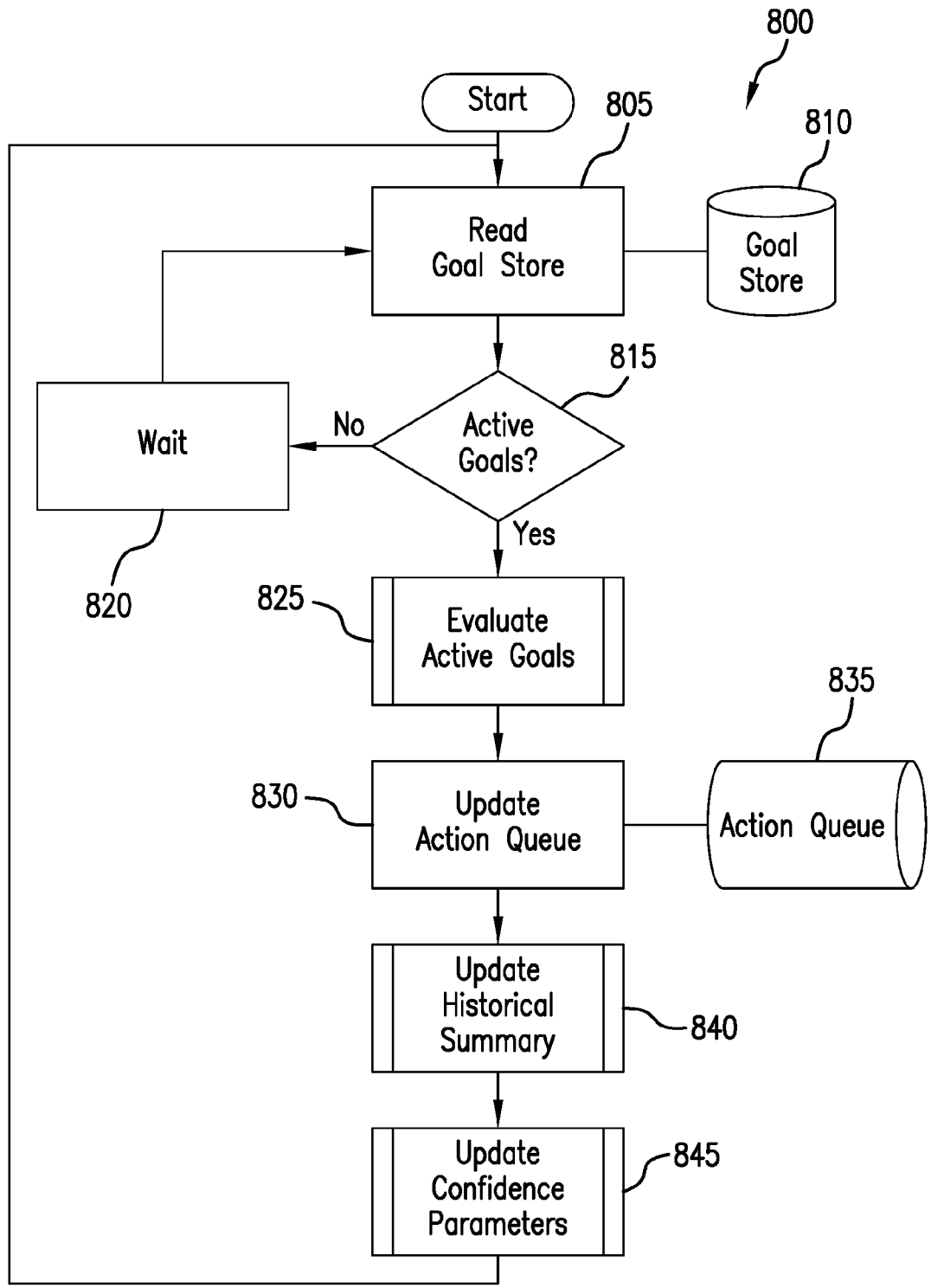
FIG. 8 depicts a flowchart illustrating an AI module of an exemplary AI operating system.

FIG. 8 depicts a flowchart illustrating an AI module of an exemplary AI operating system. With reference to FIG. 4, the AI operating system 400 includes an AI module 800. The AI module 800 retrieves, at 805, a predetermined target goal (e.g., the goal 505) from a goal store database 810. At 815 the AI module 800 determines whether the predetermined target goal is active. In the event that the predetermined target goal is not active, the AI module 800 waits, at 820, before retrieving a next goal at 805. In various embodiments, the AI module 800 may concurrently retrieve one or more goals. In some embodiments, the AI module 800 may retrieve a sub-goal of the predetermined target goal.

In the event the predetermined target goal is active, the AI module 800 evaluates, at 825, the predetermined target goal (described below in further detail in FIG. 9). The predetermined target goal may include parameters that define a unique probabilistic algorithm to calculate a confidence of successfully completing the predetermined target goal. At 825, the AI module 800 evaluates, via a Bayesian equation, parameters included in the predetermined target goal to determine a confidence of success. The AI module 800 may, at 825, account for sensor input and component state information when determining a confidence of success. In response to evaluating the predetermined target goal, at 825, the AI module 800 generates, at 830, a set of actions. The AI module 800 updates, at 835, an action queue 835 with the generated set of actions. At 840, the AI module 800 updates a historical summary database. The historical summary database may include a history of parameters associated with a goal, such as, for example, confidence, actions, magnitudes and sensor values. The historical summary database may be analyzed by the AI operating system 400, for example, to determine trends and rates of changes. In some embodiments, the determined trends and rates of change may be used to assist the AI module 800 when generating a set of actions.

At 845, the AI module 800 updates confidence parameters in accordance with the evaluation results, from step 825, and the historical summary database. The AI processor 800 may continuously evaluate a Bayesian equation used to calculate a confidence of successfully completing a predetermined target goal. As such, the AI module 800 may efficiently update the Bayesian equation to reflect recent parameters. Such Bayesian equations have been described, for example, in Appendix 2, of the U.S. Provisional Application Ser. No. 62/198,027, titled "Machine Learning for Robotics," filed by Michael Garrod, on Jul. 28, 2015, the entire disclosure of which is hereby incorporated by reference.

In various embodiments, the AI module 800 may evaluate any predetermined goal individually, in a group, or in a combination thereof. The AI module 800 may evaluate goals, sub-goals, specific goals, and core goals individually, in a group, or in a combination thereof. The AI module 800 may be configured to autonomously evaluate a set of goals to determine a set of actions for the AI operating system 400 to perform.

Figure 9:
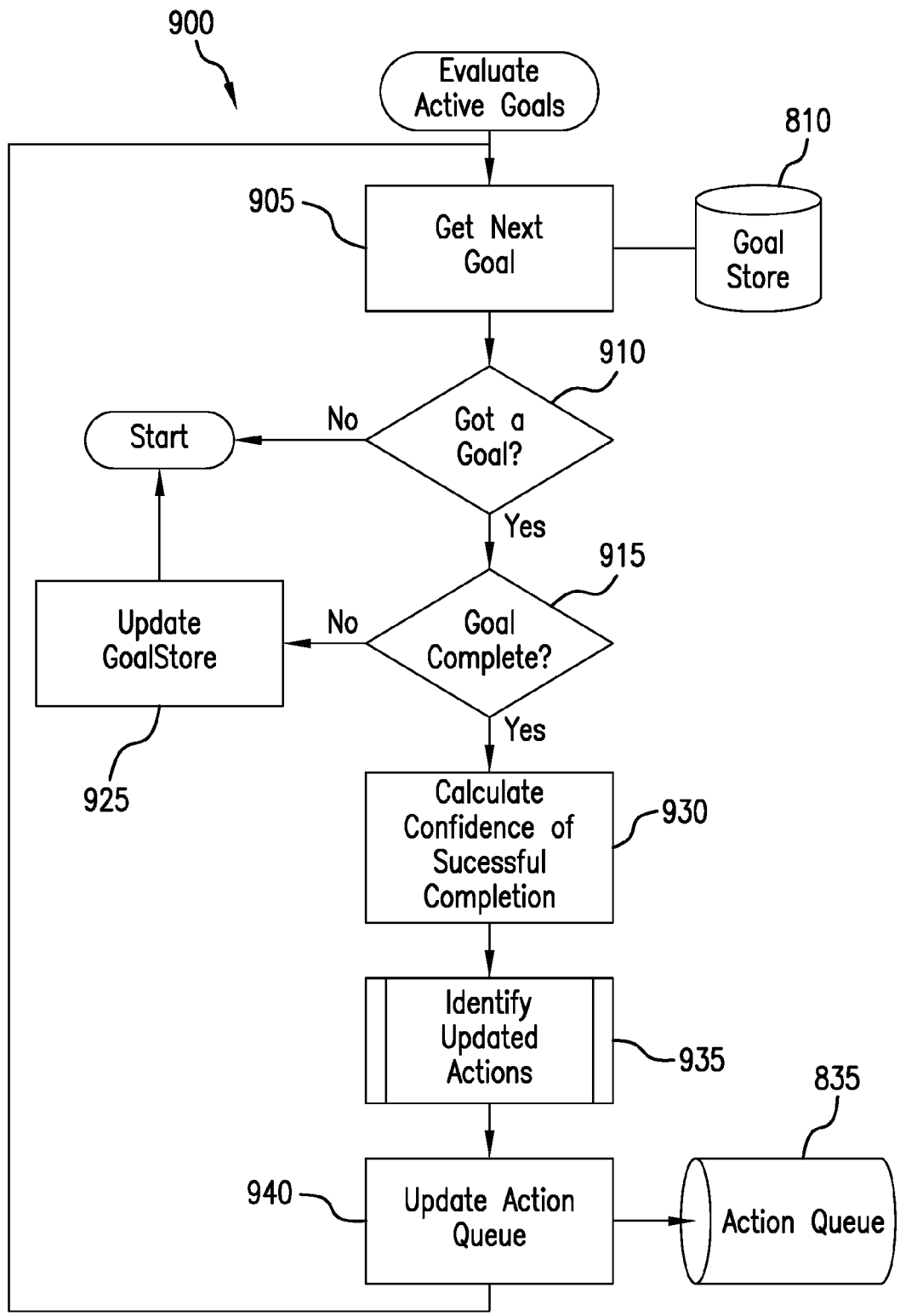
FIG. 9 depicts a flowchart illustrating a goal evaluation module of an exemplary AI operating system.

FIG. 9 depicts a flowchart illustrating a goal evaluation module of an exemplary AI operating system. With reference to FIGS. 4 and 8, the AI operating system 400 includes a goal evaluation module 900. The goal evaluation module 900 retrieves, at 905, a predetermined target goal (e.g., the goal 505) from the goal store database 810. The predetermined target goal may include an objective and a set of actions to control the achievement of the objective. The predetermined target goal may further include a threshold to define the predetermined goal as unobtainable below a predetermined confidence level. The set of actions may include parameters to be evaluated, via a Bayesian equation, to determine a confidence of success in regards to completing the retrieved next goal. The goal evaluation module 900 may measure the determined confidence of success against a threshold to determine whether the goal is obtainable.

At 910, the goal evaluation module 900 determines whether a predetermined target goal was retrieved. If, at 910, a predetermined target goal was not retrieved, the evaluation module 900 remains idle. If, at 910, the goal evaluation module 900 determines a predetermined target goal was retrieved, the goal evaluation module 900 determines, at 915, whether the predetermined target goal has completed. In the event the predetermined target goal has completed, the goal evaluation module 900 updates the goal store database 810. In the event the predetermined target goal is not complete, the goal evaluation module 900 determines, at 930, a confidence of successful completion of the predetermined target goal. The goal evaluation module 900 identifies, at 935, actions that may need to be updated in accordance with the determined confidence of successful completion. The goal evaluation module 900 updates, at 940, the action queue 835 in accordance with any updated actions from step 935. For example, if the confidence of successful completion is below a predetermined threshold, the goal evaluation module 900 may update the action queue 835 with an action to stop an operation of a component or group of components such that the confidence of successful completion may increase.

In various embodiments, a data store (e.g., data store 325) may include a list of capabilities. Each capability may reference a number of actions. A capability may describe how a referenced action may access the capability. In some embodiments, an action may reference functions to control and regulate the action. The action may reference an observed sensor effect on the AI operating system 400 by determining a sense and a magnitude of changing sensor inputs.

Figure 10:
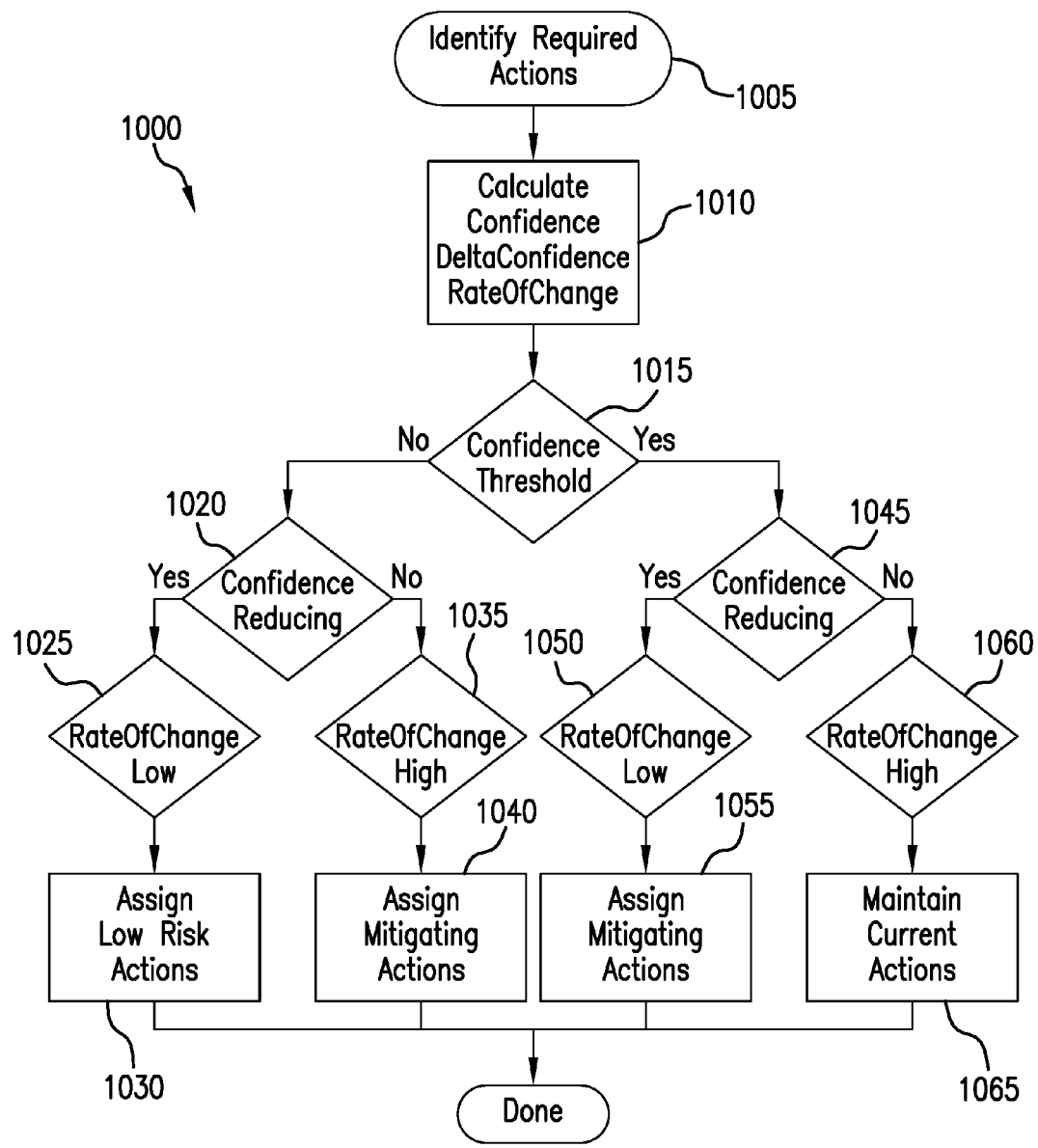
FIG. 10 depicts a flowchart illustrating an action module of an exemplary AI operating system.

FIG. 10 depicts a flowchart illustrating an action module of an exemplary AI operating system. With reference to FIGS. 4 and 8, the AI operating system 400 includes an action module 1000. The action module 1000 retrieves, at 1005, actions from the action queue 835. In response to the retrieved action, the action module 1000 determines, at 1010, a confidence of successful completion associated with the retrieved action. As depicted, the action module 1000 compares, at 1010, the confidence of successful completion with a confidence threshold to determine a confidence delta. The action module 1000 further determines, at 1010, a rate of change for which the confidence of successful completion is changing. At 1015, the action module 1000 determines, in accordance with the confidence of successful completion, the confidence delta, and the rate of change, whether the confidence of successful completion is greater than a confidence threshold. In some embodiments, a greater difference between the confidence of successful completion and the confidence threshold may indicate a greater, or lesser, percentage of completing a goal.

If, at 1015, the confidence of successful completion is less than the confidence threshold, the action module 1000 determines, at 1020, whether the confidence of successful completion is reducing. If, at 1020, the action module 1000 determines that the confidence is reducing, the action module 1000 evaluates, at 1025, the rate of change to determine whether the rate of change is low or high. As depicted, the rate of change is low, at 1025. The action module 1000 assigns, at 1030, low risk actions into an action queue. If, at 1020, the action module 1000 determines that the confidence is not reducing, the action module 1000 evaluates, at 1035, the rate of change to determine whether the rate of change is low or high. The rate of change is high, at 1035. The action module 1000 assigns, at 1040, mitigating actions into an action queue.

If, at 1015, the confidence of successful completion is greater than the confidence threshold, the action module 1000 determines, at 1045, whether the confidence of successful completion is reducing. If, at 1045, the action module 1000 determines that the confidence is reducing, the action module 1000 evaluates, at 1050, the rate of change to determine whether the rate of change is low or high. As depicted, the rate of change is low, at 1050, prompting the action module 1000 to assign, at 1055, mitigating actions into an action queue. If, at 1045, the action module 1000 determines that the confidence is not reducing, the action module 1000 evaluates, at 1060, the rate of change to determine whether the rate of change is low or high. The rate of change is high, at 1060. As such, the action module 1000 maintains a current set of actions within an action queue.

Figure 11:
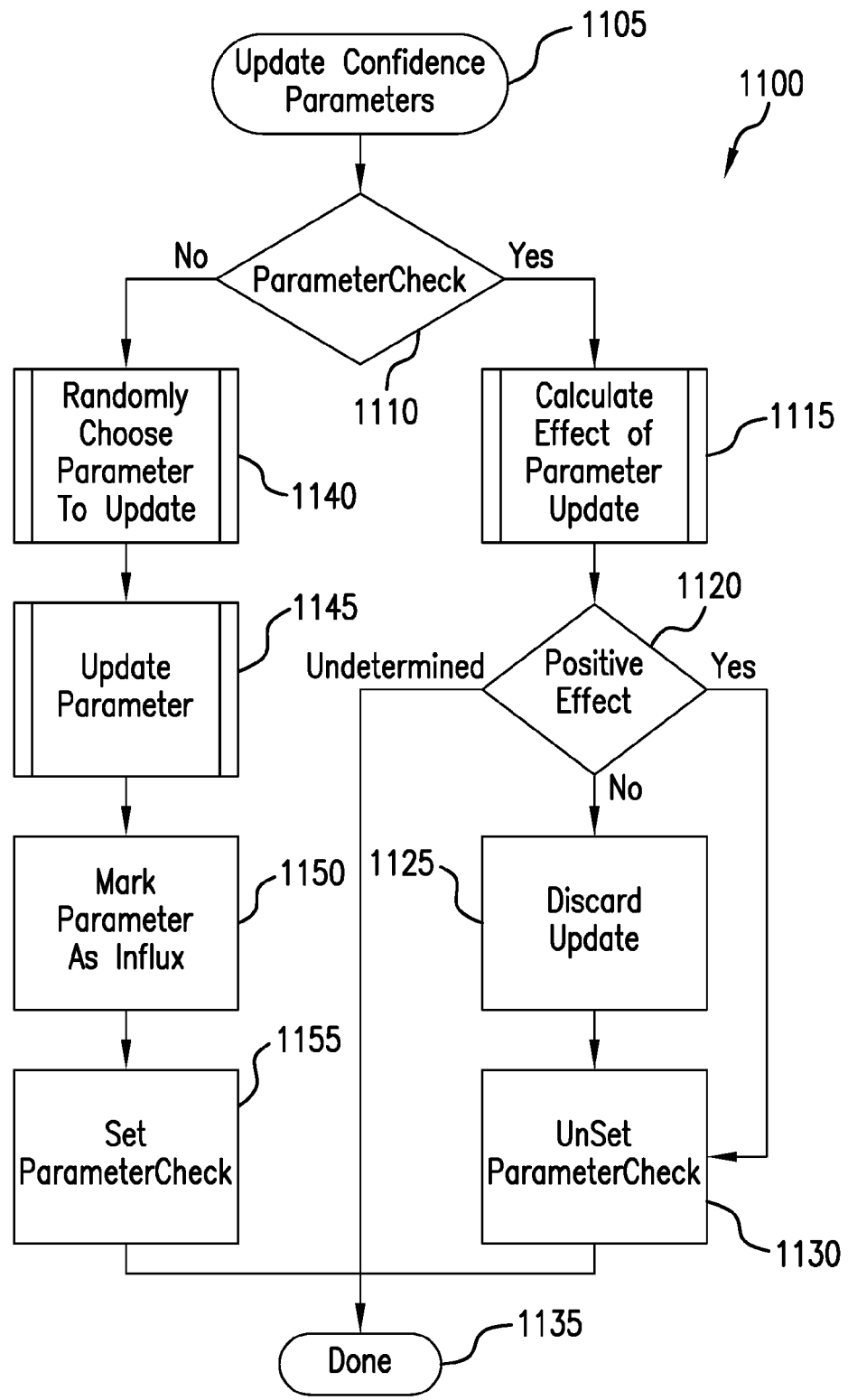
FIG. 11 depicts a flowchart illustrating an update module of an exemplary AI operating system.

FIG. 11 depicts a flowchart illustrating an update parameter module of an exemplary AI operating system. An update parameter module 1100 retrieves, at 1105, updated confidence parameters. At 1110, the update parameter module 1100 evaluates an attribute (ParameterCheck) associated with a parameter to determine whether the parameter is being updated. If, at 1110, the ParameterCheck indicates an update, the update parameter module 1100 determines an effect based on the parameter being updated. At 1120, the update parameter module 1100 determines whether the effect is positive. If the effect is not positive, the update parameter module 1100 discards, at 1125, the parameter update. The update parameter module 1100 unsets, at 1130, the ParameterCheck. In the event that the effect is determined to be positive, at 1120, the update parameter module 1100 accepts the update and then unsets, at 1130, the ParameterCheck. In the event that the effect is undetermined, the update parameter module 1100 returns to the AI operating system 400, with reference to FIG. 4, to await further instruction.

If, at 1110, the update parameter module 1100 determines that the ParameterCheck indicates no update, the update parameter module 1100 randomly selects, at 1140, a parameter to update. In an illustrative example, the parameter selected may be related to a current goal, a related action, action magnitudes, or thresholds. At 1145, the update parameter module 1100 updates the selected parameter in accordance with a predetermined amount and marks, at 1150, the parameter as influx. The update parameter module 1100 sets, at 1155, the ParameterCheck.

Figure 12:
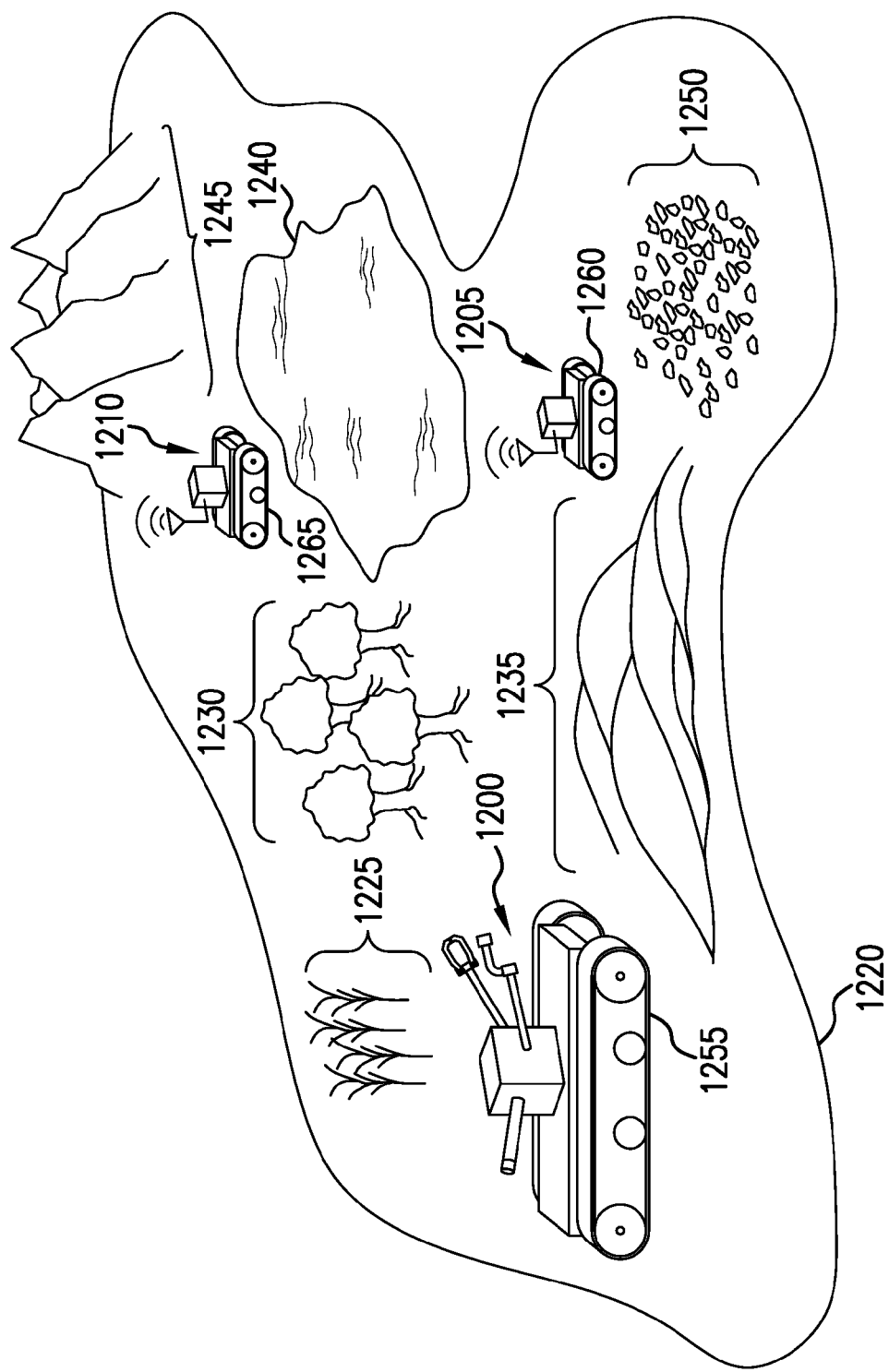
FIG. 12 depicts an exemplary robot-to-robot communication module between various robotic exploration systems.

FIG. 12 depicts an exemplary robot-to-robot communication system between various robotic exploration systems. As depicted, a geographic border 1220 defines a geographic area in which various robotic exploration systems (RES) 1200, 1205, 1210 may operate. The geographic area includes a grassy surface 1225, a surface with trees 1230, an inclined surface 1235, a pond 1240, a mountainous area 1245, and a rocky surface 1250. Each RES 1200, 1205, 1210 includes a displacement module 1255, 1260, 1265, respectively, for moving between the various surfaces 1225, 1230, 1235, 1240, 1245, 1250. As depicted, the displacement module 1255-1265 for each RES 1200-1210 is a continuous track. In various embodiments, the displacement module may be a set of robotic limbs, for example. Each RES 1200, 1205, 1210 includes a robot-to-robot communication system (described in further detail below in FIG. 13). Via the robot-to-robot communication system of each RES 1200-1210, the RES 1200-1210 may operably connect to each other to coordinate the operation of a specific task. For example, the RES 1200-1210 may operate, via the robot-to-robot communication systems, in coordination with each other to map a geographic area defined by the geographic border 1220. In an illustrative example, the RES 1200-1210 may accomplish a mapping of the geographic area more efficiently and in less time than if the RES were operating independently of each other.

In various embodiments, the RES 1200-1210 may learn from each other via the robot-to-robot communication systems. For example, the RES 1205 may collect sensor input information as the RES 1205 travels through the rocky surface 1250. The collected sensor input information may be shared, via the robot-to-robot communication systems, with the RES 1200, 1210 such that the RES 1200, 1210 may update a set of parameters associated with traveling over a rocky surface. As such, the RES 1200, 1210 receives the benefit of having an updated set of parameters for more efficiently performing an action over a rocky surface without the RES 1200, 1210 having operated over a rocky surface. In some embodiments, the RES 1205, 1210 may further update an equation or formula (e.g., Bayesian equation) based on received sensor input information from the RES 1205.

In some embodiments, the RES 1200-1210 may include a geographic boundary recognition system such that the RES 1200-1210 may only operate within a predetermined area. Such geographic boundary recognition systems have been described in U.S. Provisional Application Ser. No. 62/344,281 titled "Geo-Fencing for All Terrain Robotics," filed by Michael Garrod on Jun. 1, 2016, the entire disclosure of which is hereby incorporated by reference.

As depicted, the continuous tracks 1255-1265 may be operated to maneuver through and around the various surfaces 1225, 1230, 1235, 1240, 1245, 1250. Such continuous tracks have been described, for example, in FIG. 1 of the U.S. application Ser. No. 14/533,701 titled "Low-Resistance Slip Drive of Endless Track," filed by Domholt, et al. on Nov. 11, 2014, and, for example, in FIG. 1 of the U.S. Provisional Application Ser. No. 62/046,264 titled "Low-Resistance Slip Drive of Endless Track," filed by Thoreson, et al. on Sep. 5, 2014, and, for example, in FIG. 1 of the U.S. Provisional Application Ser. No. 62/050,582 titled "Low-Resistance Slip Drive of Endless Track," filed by Thoreson, et al. on Sep. 15, 2014, the entire disclosure of which are hereby incorporated by reference.

Figure 13:
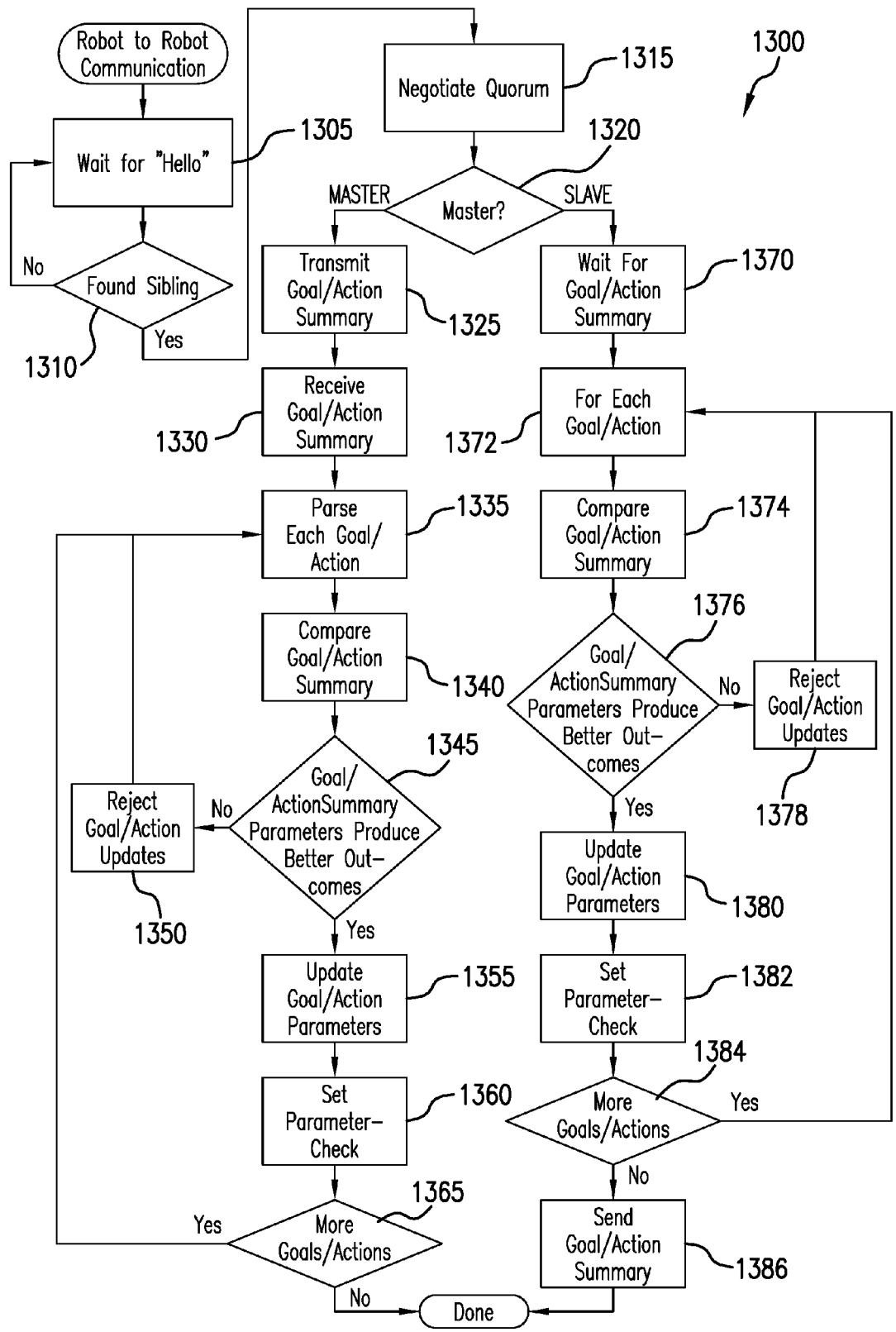
FIG. 13 depicts a flowchart for an exemplary robot-to-robot communication module of an AI operating system Like reference symbols in the various drawings indicate like elements.

FIG. 13 depicts a flowchart for an exemplary robot-to-robot communication system of an AI operating system. With reference to FIG. 4, the AI operating system 400 of a first robot (e.g., the RES 1200) includes a robot-to-robot communication system (RTRCS) 1300. The AI operating system 400 initiates, at 470, the RTRCS 1300. The RTRCS 1300, at 1305, waits for a communication from a second robot (e.g., the RES 1205). In some embodiments, the second robot may also include a RTRCS similar to the RTRCS 1300 of the robot. At 1310, the RTRCS 1300 determines whether a second robot has been detected. If a second robot has not been detected, the RTRCS 1300 continues to wait, at 1305, for a communication from a second robot. If, at 1310, the RTRCS 1300 determines that a second robot has been detected, the RTRCS 1300 negotiates, at 1315, a quorum. The quorum may indicate which robot is a master and which robot is a slave. In various embodiments, the RTRCS 1300 may detect more than one robot. For example, the RTRCS 1300 may detect a second robot and a third robot.

At, 1320, the RTRCS 1300 determines whether the first robot is a master or slave to the second robot. In the event the first robot is the master, the RTRCS 1300 transmits, at 1325, a goal and action summary to the second robot (e.g., slave). At 1330, the first robot receives a goal and action summary from the second robot. The RTRCS 1300 parses, at 1335, each goal and action included in the received goal and action summary. At 1340, the RTRCS 1300 compares, at 1340, the received goal and action summary to determine, at 1345, whether the received goal and action summary produce better outcomes than the current goal and action summary of the first robot.

If, at 1345, the RTRCS 1300 determines that the received goal and action summary does not produce a better outcome, the RTRCS 1300 rejects, at 1350, goal and action updates included in the received goal and action summary before repeating step 1335. In the event that the received goal and action summary does produce a better outcome, the RTRCS 1300 updates, at 1355, the goal and action parameters associated with the received goal and action summary. At 1360, the RTRCS 1300 sets a check parameter. The check parameter may indicate to the AI operation system 400 to execute the update parameter processor 1300, with reference to FIG. 11, to evaluate whether to accept or discard any updates which may not function with the first robot. The RTRCS 1300 determines, at 1365, whether more goals or actions from the received goals and actions summary needs to be parsed. If the RTRCS 1300 determines, at 1365, that more goals or actions needs to be parsed, the RTRCS 1300 repeats step 1335.

In the event that the first robot is a slave, the RTRCS 1300 receives, at 1370, a goal and action summary the second robot (e.g., master). At 1372, the RTRCS 1300 parses each goal and action included in the received goal and action summary. The RTRCS 1300 compares, at 1374, the received goal and action summary to determine, at 1376, whether the received goal and action summary produce better outcomes than the current goal and action summary of the first robot. If, at 1376, the received goal and action summary does not produce better outcomes, the RTRCS 1300 rejects, at 1378, goal and action updates included in the received goal and action summary before repeating step 1372. If, at 1376, the RTRCS determines that the received goal and action summary does produce better outcomes, the RTRCS 1300 updates, at 1380, the goal and action parameters associated with the received goal and action summary. The RTRCS 1300 sets, at 1382, a check parameter. At 1384, the RTRCS 1300 determines whether more goals or actions from the received goals and actions summary need to be parsed. If more goals or action need to be parsed, the RTRCS 1300 repeats step 1372. If, at 1384, the RTRCS 1300 determines no more goals or actions need to be parsed, the RTRCS 1300 transmits an updated goal and action summary to the second robot. In an illustrative example, the second robot may receive the updated goal and action summary at step 1330.

In some embodiments, the RTRCS 1300 may operate to coordinate a swarm of robots. For example, a swarm of robots, each robot including a RTRCS, may coordinate a search and rescue operation such that an individual robot of the swarm of robots assumes a master role while the remainder of the swarm of robots assume slave roles. In various embodiments, each robot may alter between master and slave in accordance with one or more predetermined criteria. For example, in the event a robot assuming the master role becomes inoperable, the remaining operable robots may re-negotiate a quorum, such as, for example, step 1315, to determine which of the operable robots will assume the master role.

Although various embodiments have been described with reference to the Figures, other embodiments are possible. For example, a RTRCS 1300 may coordinate a swarm of robots while each robot autonomously determines its own set of actions for accomplishing a goal independent of master-slave mode.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An autonomous robotic system for learning, the system comprising:
    a mobile platform having a central body;
    a displacement module operably connected to the central body and configured to displace the mobile platform;
    a payload module releasably connected to the central body and configured to perform a mission specific operation;
    an input module configured to receive a user input command;
    a controller disposed within the central body and operably connected to the displacement module and the input module;
    a data store operably coupled to the controller, wherein the data store comprises a program of instructions that, when executed by the controller, cause the controller to perform operations to adaptively optimize a control system of the mobile platform, the operations comprising:
    receive, via the input module, a predetermined target goal;
    store the predetermined goal in the data store;
    retrieve the predetermined target goal from the data store;
    retrieve a set of parameters associated with the predetermined target goal;
    retrieve a set of coefficients associated with the retrieved set of parameters;
    determine a current success probability of achieving the predetermined target goal based on a Bayesian equation formed by the retrieved set of parameters and the retrieved set of coefficients;
    receive a perturbation signal;
    modify a selected one of the retrieved coefficients or a selected one of the retrieved parameters in response to the received perturbation signal;
    determine a perturbed success probability based on the Bayesian equation using the selected one of the retrieved coefficients or the selected one of the retrieved parameters as modified by the received perturbation signal; and,
    if the perturbed success probability exceeds the current success probability, then store the selected one of the retrieved coefficients or the selected one of the retrieved parameters as modified by the received perturbation signal and in association with the predetermined target goal.

2. The system of claim 1, wherein the perturbation signal comprises one of the retrieved set of parameters.

3. The system of claim 1, wherein the perturbation signal comprises one of the retrieved set of coefficients.

4. The system of claim 3, wherein the one of the retrieved set of coefficients equals zero.

5. The system of claim 1, wherein the predetermined target goal comprises one or more sub-goals.

6. The system of claim 1, wherein the predetermined target goal is formed from a composite goal structure.

7. The system of claim 1, the input module comprises a network interface in operative communication with a user.

8. The system of claim 1, further comprising a sensor input operably connected to the controller and configured to receive sensor information about environmental surroundings of the central body.

9. The system of claim 8, wherein the operation to determine a perturbed success probability is further based on the received sensor information.

10. The method of claim 1, the operations further comprising:
    generate an action command based on the perturbed success probability, wherein in response to the generated action command, the displacement module and the payload module perform operations towards achieving the predetermined target goal.

11. An autonomous robotic system for learning, the system comprising:
    a mobile platform having a central body;
    a displacement module operably connected to the central body and configured to displace the mobile platform;
    a payload module releasably connected to the central body and configured to perform a mission specific operation;
    a controller disposed within the central body and operably connected to the displacement module;
    a data store operably coupled to the controller, wherein the data store comprises a program of instructions that, when executed by the controller, cause the controller to perform operations to adaptively optimize a control system of the mobile platform, the operations comprising:
    retrieve a predetermined target goal from the data store;
    retrieve a set of parameters associated with the predetermined target goal;
    retrieve a set of coefficients associated with the retrieved set of parameters;
    determine a current success probability of achieving the predetermined target goal based on a Bayesian equation formed by the retrieved set of parameters and the retrieved set of coefficients;
    receive a perturbation signal;
    modify a selected one of the retrieved coefficients or a selected one of the retrieved parameters in response to the received perturbation signal;
    determine a perturbed success probability based on the Bayesian equation using the selected one of the retrieved coefficients or the selected one of the retrieved parameters as modified by the received perturbation signal; and, if the perturbed success probability exceeds the current success probability, then store the selected one of the retrieved coefficients or the selected one of the retrieved parameters as modified by the received perturbation signal and in association with the predetermined target goal.

12. The system of claim 11, further comprising an input module for receiving a user input command and operably connected to the controller, wherein the predetermined target goal is retrieved from the received user input command.

13. The system of claim 11, wherein the perturbation signal comprises one of the retrieved set of parameters.

14. The system of claim 11, wherein the perturbation signal comprises one of the retrieved set of coefficients.

15. The system of claim 14, wherein the one of the retrieved set of coefficients equals zero.

16. An autonomous robotic system for learning, the system comprising:
a mobile platform having a central body;
means for displacing the central body;
a payload module releasably connected to the central body and configured to perform a mission specific operation;
a controller disposed within the central body and operably connected to the displacement module;
a data store operably coupled to the controller, wherein the data store comprises a program of instructions that, when executed by the controller, cause the controller to perform operations to adaptively optimize a control system of the mobile platform, the operations comprising:
retrieve a predetermined target goal from the data store;
retrieve a set of parameters associated with the predetermined target goal;
retrieve a set of coefficients associated with the retrieved set of parameters;
determine a current success probability of achieving the predetermined target goal based on a Bayesian equation formed by the retrieved set of parameters and the retrieved set of coefficients;
receive a perturbation signal;
modify a selected one of the retrieved coefficients or a selected one of the retrieved parameters in response to the received perturbation signal;
determine a perturbed success probability based on the Bayesian equation using the selected one of the retrieved coefficients or the selected one of the retrieved parameters as modified by the received perturbation signal; and,
if the perturbed success probability exceeds the current success probability, then store the selected one of the retrieved coefficients or the selected one of the retrieved parameters as modified by the received perturbation signal and in association with the predetermined target goal.

17. The system of claim 16, further comprising an input module for receiving a user input command and operably connected to the controller, wherein the predetermined target goal is retrieved from the received user input command.

18. The system of claim 16, wherein the perturbation signal comprises one of the retrieved set of parameters.

19. The system of claim 16, wherein the perturbation signal comprises one of the retrieved set of coefficients.

20. The system of claim 19, wherein the one of the retrieved set of coefficients equals zero.

* * * * *